(12) United States Patent
Miyata

(10) Patent No.: US 10,992,927 B2
(45) Date of Patent: Apr. 27, 2021

(54) STEREOSCOPIC IMAGE DISPLAY APPARATUS, DISPLAY METHOD OF LIQUID CRYSTAL DISPLAY, AND NON-TRANSITORY COMPUTER-READABLE RECORDING MEDIUM STORING PROGRAM OF LIQUID CRYSTAL DISPLAY

(71) Applicant: SHARP KABUSHIKI KAISHA, Sakai (JP)

(72) Inventor: Hidekazu Miyata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/289,955

(22) Filed: Mar. 1, 2019

(65) Prior Publication Data

US 2019/0281278 A1    Sep. 12, 2019

(30) Foreign Application Priority Data

Mar. 6, 2018    (JP) .............................. JP2018-039887

(51) Int. Cl.
*G02F 1/13357*    (2006.01)
*H04N 13/344*    (2018.01)
(Continued)

(52) U.S. Cl.
CPC ......... *H04N 13/344* (2018.05); *G02F 1/1336* (2013.01); *H04N 13/167* (2018.05); *H04N 13/31* (2018.05)

(58) Field of Classification Search
CPC .... H04N 13/344; H04N 13/31; H04N 13/167; G02F 1/1336; G02B 27/2214; G09G 3/342
See application file for complete search history.

(56) References Cited

U.S. PATENT DOCUMENTS 6,392,690 B1 *   5/2002   Fujii ..................... G02B 30/27
                                                348/59
2003/0001815 A1 *   1/2003   Cui ...................... G09G 3/3406
                                                345/102
(Continued)

FOREIGN PATENT DOCUMENTS

CN    107680542 A    2/2018
JP    2006-047507 A    2/2006

OTHER PUBLICATIONS

Kishimoto Shunichi, "3D display and liquid crystal technology—the ultimate display developed by liquid crystal-", EKISYO (Journal of the Japan Society for Liquid Crystal Society), vol. 5, No. 1, pp. 3 to 19, 2001 (A concise explanation of the relevance can be found in paragraph [0002] of the specification of the subject application).

*Primary Examiner* — Jose R Soto Lopez
(74) *Attorney, Agent, or Firm* — ScienBiziP, P.C.

(57) ABSTRACT

A stereoscopic image display apparatus includes an illumination unit in which a plurality of light sources are disposed, a transmission unit that transmits light arriving from the illumination unit for each pixel based on an input image, and changes transmittance of the light for each pixel; a barrier unit that allows the light transmitted through the transmission unit to be viewed as a right-eye image and a left-eye image; and a control unit that divides an area of the illumination unit based on the input image and controls emission luminance of the light source for each area.

7 Claims, 13 Drawing Sheets

(51) Int. Cl.
*H04N 13/167* (2018.01)
*H04N 13/31* (2018.01)

(56) References Cited

U.S. PATENT DOCUMENTS

| | | | | |
|---|---|---|---|---|
| 2004/0160435 A1* | 8/2004 | Cui | G09G 3/3406 | 345/211 |
| 2011/0157167 A1* | 6/2011 | Bennett | G06F 3/14 | 345/419 |
| 2011/0292184 A1* | 12/2011 | de Greef | G09G 3/003 | 348/51 |
| 2011/0298905 A1* | 12/2011 | Kim | H04N 13/133 | 348/54 |
| 2012/0007895 A1* | 1/2012 | Kim | H04N 13/341 | 345/690 |
| 2012/0013601 A1* | 1/2012 | Park | G02B 30/24 | 345/419 |
| 2012/0086713 A1* | 4/2012 | Cho | G09G 3/003 | 345/419 |
| 2012/0086777 A1* | 4/2012 | Chen | H04N 13/128 | 348/46 |
| 2012/0127160 A1* | 5/2012 | Won-Kim | H04N 13/341 | 345/419 |
| 2012/0154381 A1* | 6/2012 | Chen | H04N 13/341 | 345/419 |
| 2012/0194751 A1* | 8/2012 | Lo | H04N 13/31 | 349/15 |
| 2012/0257026 A1* | 10/2012 | Lee | H04N 13/341 | 348/55 |
| 2012/0320056 A1* | 12/2012 | Ahn | G09G 3/003 | 345/426 |
| 2013/0002837 A1* | 1/2013 | Yuno | H04N 13/341 | 348/56 |
| 2013/0141423 A1* | 6/2013 | Cho | H04N 13/305 | 345/419 |
| 2013/0141424 A1* | 6/2013 | Chang | H04N 13/341 | 345/419 |
| 2013/0241962 A1* | 9/2013 | Cha | G09G 3/003 | 345/690 |
| 2014/0078194 A1* | 3/2014 | An | H04N 13/302 | 345/691 |
| 2014/0132711 A1* | 5/2014 | Brown Elliott | H04N 13/315 | 348/43 |
| 2014/0292789 A1* | 10/2014 | Kim | H04N 13/366 | 345/536 |
| 2016/0189633 A1* | 6/2016 | Lim | H04N 13/32 | 348/51 |
| 2016/0351102 A1* | 12/2016 | Shin | G09G 3/2011 | |
| 2017/0082895 A1* | 3/2017 | Sakai | G02B 5/3041 | |
| 2017/0160550 A1* | 6/2017 | Kobayashi | H04N 13/356 | |
| 2017/0337712 A1* | 11/2017 | Nakashima | H04N 13/315 | |
| 2018/0077408 A1* | 3/2018 | Suzuki | H04N 13/32 | |
| 2018/0090078 A1* | 3/2018 | Chang | G09G 3/3406 | |
| 2018/0359463 A1* | 12/2018 | Mori | H04N 13/344 | |
| 2018/0376133 A1* | 12/2018 | Wu | G02F 1/133528 | |
| 2018/0376134 A1* | 12/2018 | Koerber | H04N 13/376 | |
| 2019/0035364 A1* | 1/2019 | Iwasaki | G02F 1/137 | |
| 2019/0243151 A1* | 8/2019 | Hansen | G02B 27/0101 | |
| 2019/0295479 A1* | 9/2019 | An | G09G 3/3426 | |

\* cited by examiner

FIG. 10A
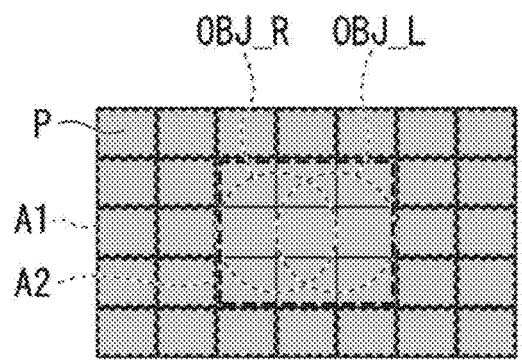
FIG. 10B
FIG. 11
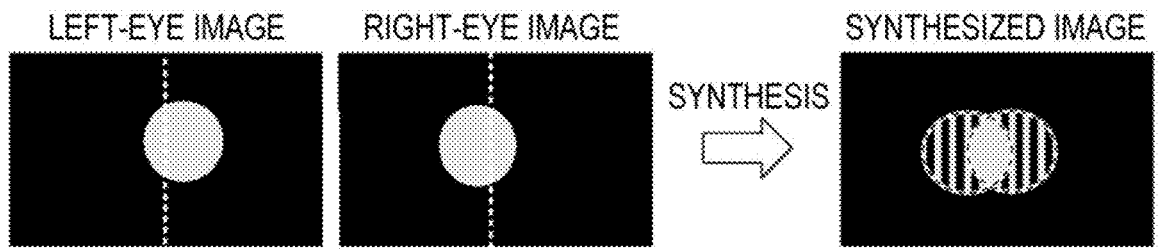

STEREOSCOPIC IMAGE DISPLAY APPARATUS, DISPLAY METHOD OF LIQUID CRYSTAL DISPLAY, AND NON-TRANSITORY COMPUTER-READABLE RECORDING MEDIUM STORING PROGRAM OF LIQUID CRYSTAL DISPLAY

BACKGROUND

1. Field

The present disclosure relates to a stereoscopic image display apparatus, a display method of a liquid crystal display, and a non-transitory computer-readable recording medium storing a program of a liquid crystal display.

2. Description of the Related Art

In recent years, stereoscopic image display apparatuses capable of displaying stereoscopic (three-dimensional) images in addition to flat (two-dimensional) images have become widespread. As described in Kishimoto Shunichi, "3D display and liquid crystal technology-ultimate display developed by liquid crystal", EKISYO (Journal of the Japan Liquid Crystal Society), Vol. 5, No. 1, PP 3-19, 2001, there are various methods of displaying stereoscopic images, but the methods of displaying stereoscopic images are roughly classified into a method using glasses worn by a user and a method not using glasses worn by a user.

As the method using glasses worn by a user, for example, there is a method in which a right-eye image and a left-eye image are alternately displayed on a display surface of a stereoscopic image display apparatus, the right-eye image and the left-eye image are separated by using glasses with a liquid crystal shutter and d splayed on respective eyes, so a solid is recognized. Further, as another method using glasses worn by a user, there is a method in which a right-eye image and a left-eye image whose polarization directions are orthogonal to each other are simultaneously displayed, and the displayed image is separated into the right-eye image and the left-eye image using glasses having different right and left polarization directions, and the right-eye image and the left-eye image are displayed on respective eyes and recognized as a solid.

As the method not using glasses worn by a user, there are a parallax barrier method and a lenticular method. In these methods, a stereoscopic image is displayed by using a parallax division method of a line of sight. The parallax barrier method and the lenticular method display a right-eye image and a left-eye image on one display surface, but for example, in a stereoscopic image display apparatus using the parallax barrier method, which is one of the methods, by providing a parallax barrier on the user side of a liquid crystal panel (display screen), the right-eye image is input only to the right eye and the left-eye image is input only to the left eye. Therefore, in this stereoscopic image display apparatus, parallax is provided between the right-eye image and the left-eye image to make the user recognize a solid. On the other hand, in the lenticular method, a lens is provided instead of the parallax barrier of the above-mentioned method, and the traveling direction of the light is controlled such that the right-eye image is input only to the right eye and the left-eye image is input only to the left eye, so parallax is provided between the right-eye image and the left-eye image to make the user recognize a solid.

In the parallax barrier method and the lenticular method, when the user's viewpoint is shifted, the light beams respectively input to the right eye and the left eye are shifted, so there is a problem of so-called "reverse vision" in which the right-eye image is input to the left eye and the left-eye image is input to the right eye due to the shift amounts of the light beams. As a countermeasure against this, there is a parallax barrier method of tracking a view point (or face), and switching the display positions of the right-eye image and the left-eye image with the positions of the barrier lines by the parallax barrier according to the tracking position to prevent reverse vision.

Further, in a normal display, even a three-dimensional display is often used as a two-dimensional display that displays two-dimensional image content in many cases. However, in a stereoscopic image display apparatus adopting the parallax barrier method, when two-dimensional image contents are displayed, there is a problem that the resolution is halved in a twin-lens system. In addition, in a multi-lens system, (corresponding to a large number of viewpoints, as the number of multiple lenses increases, it corresponds to motion parallax as well), there is a problem that the resolution becomes 1/n depending on the number of viewpoints. Due to this problem, in the stereoscopic image display apparatus of the parallax barrier type, an on/off switching function may be added to the parallax barrier not to lower the resolution at the time of di playing the two-dimensional image.

For example, a display apparatus of Japanese Unexamined Patent Application Publication No. 2006-47507 includes a thin film transistor (TFT) liquid crystal panel as a parallax barrier. In the case of using the TFT liquid crystal panel as the parallax barrier, since there is no need of gradation display, the display apparatus performs switching between white (transparent) as on and black (shielded) as off. In addition, the TFT liquid crystal panel operates to form a barrier of a stripe shape whose vertical direction is the longitudinal direction rather than a matrix shape like a pixel. Further, by controlling on and off in the TFT liquid crystal panel which is the parallax barrier with high precision, it is possible to shift the position of the barrier to cope with the reverse vision.

However, in order to improve the image quality of the TV broadcast, as High Dynamic Range (HDR), HNK and BCC proposes Hybrid Log-Gamma (HLG) method, and Dolby proposes Perceptual Quantizer (PQ) method, which are spreading. HDR is the standard that can output luminance of 1000 nits to 10000 nits, whereas the luminance output of the method (sometimes called SDR) in the related art is 100 nits. As the specification of a liquid crystal display corresponding to HDR, there is no need to satisfy the criterion that the maximum luminance is 1000 nits or more and the black luminance is 0.05 nits or less (CR twenty thousand:1). Therefore, the liquid crystal display corresponding to HDR often has a backlight capable of local dimming control. In the liquid crystal display of the local dimming type, the backlight is divided into a plurality of areas, and the emission luminance of each light source is controlled in units of divided areas.

Meanwhile, due to the influence of the spread of HDR of TV broadcasting, displays for personal computers and other monitors are required to have HDR technology, and it is possible that this technology will spread to each display device in the future.

In the liquid crystal display of the local dimming type, the backlight is divided into a plurality of areas, and the emission luminance of: the light source of: each area is changed according to the display image. In the case of the local dimming method, the emission luminance of each light source of the backlight and the transmittance of the pixel of the liquid crystal panel are estimated such that the luminance of each pixel on the display surface is expressed as "the luminance of the pixel of interest on the display surface"="the sum of the luminance contributing to the pixel of interest from the light of each light source around the pixel of interest"בthe transmittance of the pixel of interest of the liquid crystal panel". Such backlight control is called local dimming control.

However, in a display apparatus that displays a stereoscopic image by the parallax barrier method and in a display on a liquid crystal display that performs local dimming control, in a case where an image having a difference in luminance between the background and the solid in front of the background is displayed, the luminance unevenness may appear in the stereoscopic image on the display surface depending on the image to be displayed. For example, as shown in FIG. 16A, in a case where a stereoscopic image including a gray circle image (the inside of a circle has the same high luminance halftone gradation) is displayed in front of a black background image, luminance unevenness occurs in the round image on the display surface as shown in FIG. 16B, despite desiring to display the inside of the circle image with the same luminance on the display surface. FIGS. 16A to 16B are diagrams showing an example of a stereoscopic image in the related art.

FIG. 17 is a diagram showing screen display without the parallax barrier of the right-eye image and the left-eye image subjected to the local dimming control in the related art in the case where there is no parallax barrier. In the case of displaying a stereoscopic image by the parallax barrier method, a right-eye image and a left-eye image are displayed on one screen, and the right-eye image is displayed on the left eye and the left-eye image is displayed on the right eye by the parallax barrier placed on the front side (user side) of the screen such that the user can only view images that correspond to the user's eyes. For example, as shown in FIG. 16A, in a case where a stereoscopic image including a circle image is di played in front of a black background image, when the parallax barrier is removed, as shown in FIG. 17, the right-eye image and the left-eye image are alternately displayed on one image display surface every same number of vertical lines.

In the display of the local dimming type, the emission luminance of each light source is determined according to the luminance (the luminance desired to be displayed on the display surface) of the pixel included in the area corresponding to each light source.

The area A100-1 corresponding to the first light source includes pixels displaying the round image of the right-eye image and pixels displaying the round image of the left-eye image. For example, the emission luminance value of the first light source is calculated according to the average value (100) of the luminance value (100) of the pixel displaying the round image of the right-eye image and the luminance value (100) of the pixel displaying the round image of the left-eye image. The numbers in parentheses in the preamble are examples of luminance values.

The area A100-2 corresponding to the second light source includes pixels displaying the background of the right-eye image and pixels displaying the round image of the left-eye image. For example, the emission luminance value of the second light source is calculated according to the average value (50) of the luminance value (50) of the pixel displaying the background of the right-eye image and the luminance value (100) of the pixel displaying the round image of the left-eye image.

The area A100-3 corresponding to the third light source includes pixels displaying the round image of the right-eye image and pixels displaying the background of the left-eye image. For example, the emission luminance value of the third light source is calculated according to the average value (50) of the luminance value (100) of the pixel displaying the round image of the right-eye image and the luminance value (0) of the pixel displaying the background of the left-eye image.

As described above, the light source corresponding to each of the areas A100-1, -2 and -3 has different values or emission luminance.

FIG. 18 is a diagram for explaining the luminance of the right-eye pixel and the left-eye pixel on the liquid crystal panel surface, in screen display without the parallax barrier of the right-eye image and the left-eye image subjected to the local dimming control in the related art in the case where there is no parallax barrier.

As described with reference to FIG. 17, the values of emission luminance of the light sources corresponding to the area A100-1 are different from each other, and furthermore, since the plurality of light sources around the pixel of interest affect the luminance of the pixel of interest, the sum A of the values of emission luminance of the light sources affecting the right-eye pixels and the sum B of the values of emission luminance of the light sources affecting the left-eye pixels corresponding to the right-eye pixels are different.

In order to display the right-eye pixel and the left-eye pixel at the same luminance on the display surface, there is need to control the transmittance C of the pixel of the liquid crystal panel corresponding to the right-eye pixel and the transmittance D of the pixel of the liquid crystal panel corresponding to the right-eye pixel. That is, there is need to control the luminance A of the right-eye pixel×the transmittance: C and the luminance B of the left-eye pixel×transmittance: D to be the same. However, since the transmittance of the liquid crystal panel pixels is nonlinear and discrete and the control range of the transmittance is limited, the luminance of the right-eye pixel on the panel screen is A×C=a, and the luminance of the left-eye pixel on the panel screen is B×D=b, in which a and b may not have the same luminance in some cases. From this, unevenness occurs in the luminance of the round image on the display surface.

In particular, as shown in FIG. 16, the sum A of the values of luminance estimated from the light emitted from the backlight of the pixels included in the area A 100-1 with uniform luminance on the display surface and the sum B of the values of luminance estimated from the light emitted from the backlight of the pixels included in the area A 100-2 with a great difference in values of luminance of the pixels on the display surface are increased, so in the pixels outputting the same luminance, it becomes difficult to make the values of luminance of the pixels on the display surface the same between the two areas.

FIG. 19 is a diagram for explaining the luminance of a pixel perceived by a user when a stereoscopic image is displayed. In the case of a stereoscopic image, the right-eye image and the left-eye image of the stereoscopic image are displayed on one screen at different positions depending on parallax. The luminance of she pixel on the display surface recognized by the user is perceived as the average luminance of the right-eye pixel and the left-eye pixel as in the following expression.

Luminance of pixel of interest in display=(luminance of pixel in right-eye image corresponding to pixel of interest+luminance of pixel in left-eye image corresponding to pixel of interest)/2

That is, as described with reference to FIG. 18, when the luminance of the right-eye pixel on the panel screen is a and the luminance of the left-eye pixel corresponding to the right-eye pixel is b, the luminance c of pixels on the display surface perceived by the user is as follows.

$$c=(a+b)/2$$

Therefore, the luminance c of the pixel on the display surface is different from the luminance a of the pixel on the display surface which is desired to be perceived. The manner of change in the luminance difference becomes an unnatural change, and luminance unevenness becomes conspicuous (unnatural).

Further, in the case of a liquid crystal display, in the liquid crystal display of the local dimming type, having a viewing angle characteristic, even for the pixels having the same luminance as viewed from the front on the display surface, in an area where the values of emission luminance of the light sources of: the backlight are different, pixels outputting the same luminance have different values of transmittance of the liquid crystal panel and the same luminance of the image seen from the front of the display surface, but when a viewing angle is added, the luminance difference of the image increases according to the viewing angle, so the luminance of the image on the display surface does not become the same.

Further, since the display of the parallax barrier type is a display system that allows respective eyes to recognize the left and right images with rays of different angles, the difference in luminance due to the viewing angle becomes conspicuous.

It is desirable to provide a stereoscopic image display apparatus, a display method of a liquid crystal display, and a non-transitory computer-readable recording medium storing a liquid crystal display program, capable of suppressing luminance unevenness in a stereoscopic image when executing local dimming control in the case of displaying the stereoscopic image by a parallax barrier method.

SUMMARY

According to an aspect of the disclosure, there is provided a stereoscopic image display apparatus including: an illumination unit in which a plurality of light sources are disposed; a transmission unit that transmits light arriving from the illumination unit for each pixel based on an input image, and changes transmittance of the light for each pixel; a barrier unit that allows the light transmitted through the transmission unit to be viewed as a right-eye image and a left-eye image; and a control unit that divides an area of the illumination unit based on the input image and controls emission luminance of the light source for each area.

According to an aspect of the disclosure, there is provided a display method of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be viewed as a right-eye image and a left-eye image, the method including: dividing an area of the illumination unit based on the input image, and controlling emission luminance of the light source for each area.

According to an aspect of the disclosure, there is provided a non-transitory computer-readable recording medium storing a program of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be viewed as a right-eye image and a left-eye image, the program causing a computer of the liquid crystal display to divide an area of the illumination unit based on the input image and control emission luminance of the light source for each area.

BRIEF DESCRIPTION OF THE DRAWINGS

FIGS. 10A to 10B are diagrams for explaining an example of the process for integrating areas;

FIG. 11 is a diagram showing an example of image data after synthesis;

DESCRIPTION OF THE EMBODIMENTS

Hereinafter, a stereoscopic image display apparatus, a display method of a liquid crystal display, and a program of a liquid crystal display, to which the disclosure is applied, will be described with reference to the drawings.

First Embodiment

Overall Configuration of Stereoscopic Image Display Apparatus 1

Figure 1:
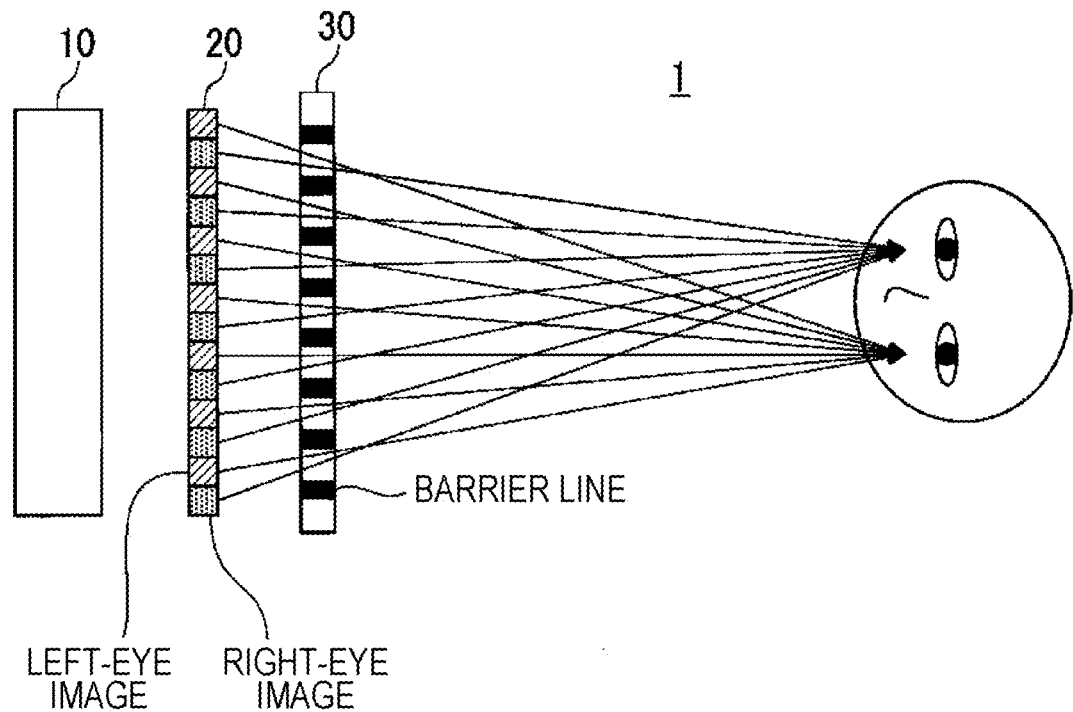
FIG. 1 is a diagram illustrating a configuration example of a stereoscopic image display apparatus according to a first embodiment.

FIG. 1 is a diagram showing a configuration example of a stereoscopic image display apparatus according to a first embodiment. The stereoscopic image display apparatus 1 performs stereoscopic display by the parallax barrier method and drives the backlight by local dimming control. The stereoscopic image display apparatus 1 includes, for example, a backlight 10 (illumination unit), a liquid crystal panel 20 (transmission unit), and a parallax barrier 30 (barrier unit). The liquid crystal panel 20 is disposed on the user side from the backlight 10. The parallax barrier 30 is disposed on the user side from the liquid crystal panel 20. The user side of the parallax barrier 30 is the display surface of the stereoscopic image display apparatus 1.

The backlight 10 includes a plurality of light sources. Each of the plurality of light sources is disposed corresponding to at least one of the areas obtained by dividing the display surface of the stereoscopic image display apparatus 1 into a plurality of areas. In each of the plurality of divided areas, the emission luminance of the light source in each area is controlled based on the image data input to the stereoscopic image display apparatus 1.

The liquid crystal panel 20 transmits light coming from the backlight 10 for each pixel. The liquid crystal panel 20 changes transmittance of each pixel based on liquid crystal panel data including transmittance corresponding to pixels and emission luminance information of a light source in a corresponding area of the backlight 10. The liquid crystal panel 20 displays a stereoscopic image that can be stereoscopically viewed by the parallax barrier method. The stereoscopic image includes a left-eye image viewed with only the user's left eye and a right-eye image viewed with only the user's right eye. The liquid crystal panel 20 alternately displays the pixels for the right eye and the pixels for the left eye in a direction orthogonal to the vertical direction on the display surface.

The parallax barrier 30 is, for example, a TFT liquid crystal panel. The parallax barrier 30 generates linear barrier lines whose vertical direction is the longitudinal direction at regular intervals. Thus, the parallax barrier 30 forms a slit through which the image can be viewed between the barrier lines. The parallax barrier 30 allows the left-eye image to be viewed only by the user's left eye and the right-eye image to be viewed only by the user's right eye, through the slit.

Stereoscopic Display by Parallax Barrier Method

Figure 2:
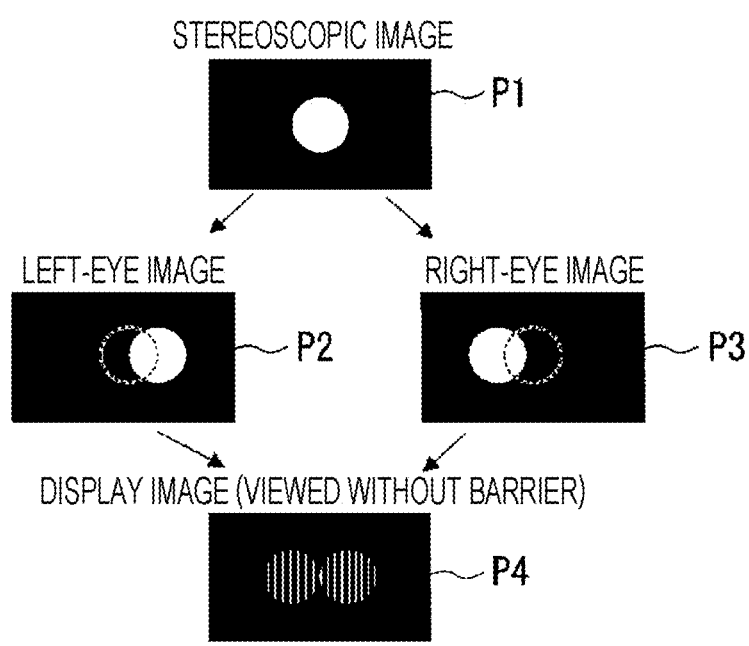
FIG. 2 is a diagram for explaining that a stereoscopic image is displayed by a parallax barrier method.

FIG. 2 is a diagram for explaining that a stereoscopic image is displayed by a parallax barrier method. It is considered that the stereoscopic image display apparatus 1 displays a stereoscopic image P1 including a background image of a black image and a white ball located closer to the user than the background as an object image. A left-eye image P2 is an image for allowing the object image to be viewed on the right side of the display surface by the parallax. A right-eye image P3 is an image for allowing the object image to be viewed on the left side of the display surface by the parallax. The dotted lines in the left-eye image P2 and the right-eye image P3 represent positions at which the object image is viewed in the stereoscopic image P1. In the liquid crystal panel 20, the transmittance for each pixel is controlled based on the left-eye image P2 and the right-eye image P3. The liquid crystal panel 20 displays the display image P4 including the left-eye image P2 and the right-eye image P3 in a region excluding the positions barred by the parallax barrier 30, for the right and left eyes. Thus, the left-eye image P2 is viewed by the user's left eye through the parallax barrier 30, and the right-eye image P3 is viewed by the user's right eye through the parallax barrier 30.

Figure 3:
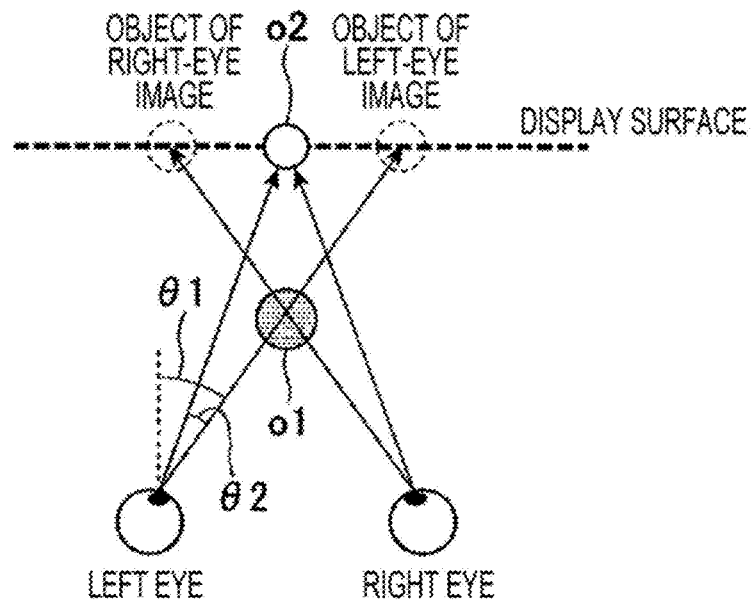
FIG. 3 is a diagram for explaining that an image is viewed as a solid.

FIG. 3 is a diagram for explaining that an image is viewed as a solid. When the user views the display surface of the stereoscopic image display apparatus 1, in a case where the object displayed as the left-eye image only with the left eye and the object displayed as the right-eye image with only the right eye are the same object, the user can view a stereoscopic image in which the object o1 exists in front of the display surface. On the other hand, in a case where a planar image is displayed on the display surface by the stereoscopic image display apparatus 1, the object o2 displayed as a planar image is viewed as existing on the display surface. The angle θ1 of the line of sight for the user to view the object o1 as a three-dimensional object is larger than the angle θ1 of the line of sight for the user to view the object o2 as a planar object. Therefore, the viewing angle when viewing the object o1 as a three-dimensional object is larger than the viewing angle when viewing the object o2 as a planar object.

Backlight Control by Local Dimming Method

Figure 4:
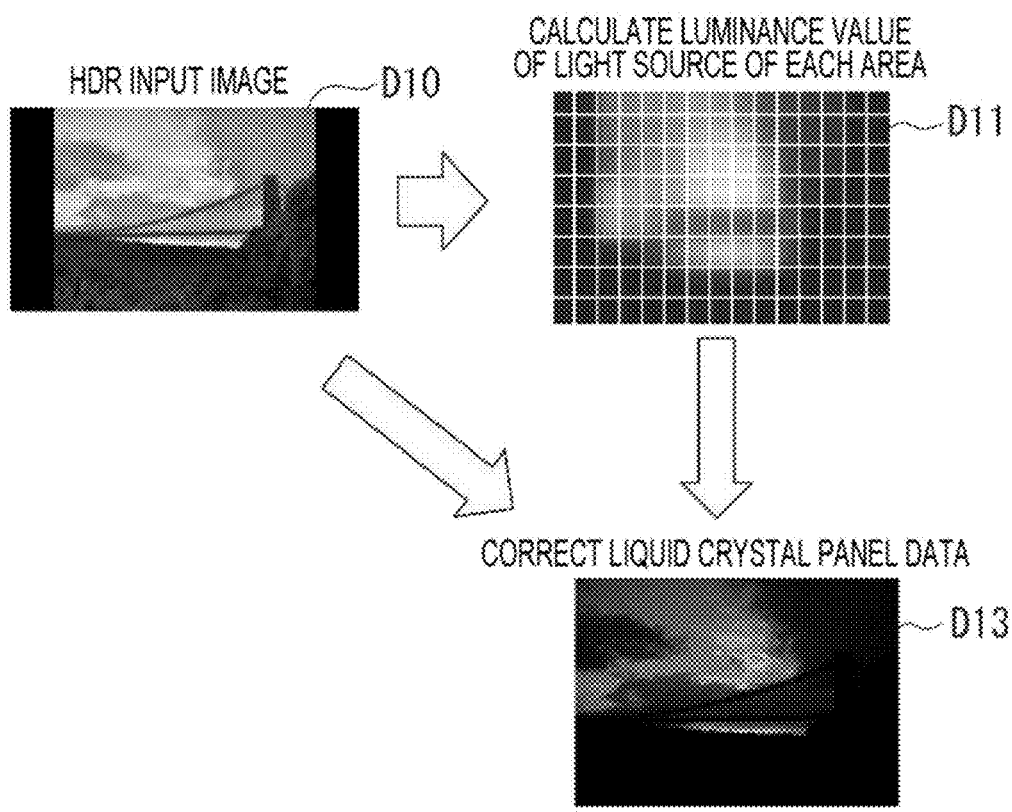
FIG. 4 is a diagram for explaining backlight control and transmittance control of liquid crystal panel pixels by the local dimming method.

FIG. 4 is a diagram for explaining backlight control and transmittance control of liquid crystal panel pixels by the local dimming method. In the local dimming control, the backlight is divided into a plurality of areas, and the emission luminance of each light source of the backlight 110 is controlled for each of the divided areas by an input image. Hereinafter, one area which is the minimum unit of backlight control by the local dimming method is simply referred to as "area". For this purpose, the backlight 110 includes at least one light source corresponding to, for example, an area. For example, when acquiring the HDR input image D10, the stereoscopic image display apparatus 1 calculates luminance value data D11 including the emission luminance value of the light source corresponding to each area, based on the pixel value (the value of each pixel corresponding to the display luminance of the image: gradation value) in the HDR input image D10. The luminance value data D11 is information representing the emission luminance value of each of the plurality of light sources included in the backlight 110. The stereoscopic image display apparatus 1 corrects the liquid crystal panel data D13, based on the HDR input image D10 and the luminance value data D11. The liquid crystal panel data D13 is information indicating the transmittance of the liquid crystal panel 20, and for example, is information indicating the transmittance of the liquid crystal panel 20 which is estimated considering the emission luminance of the plurality of light sources included in the backlight 110 at the positions corresponding to the pixels, for each pixel of the HDR input image.

Figure 5:
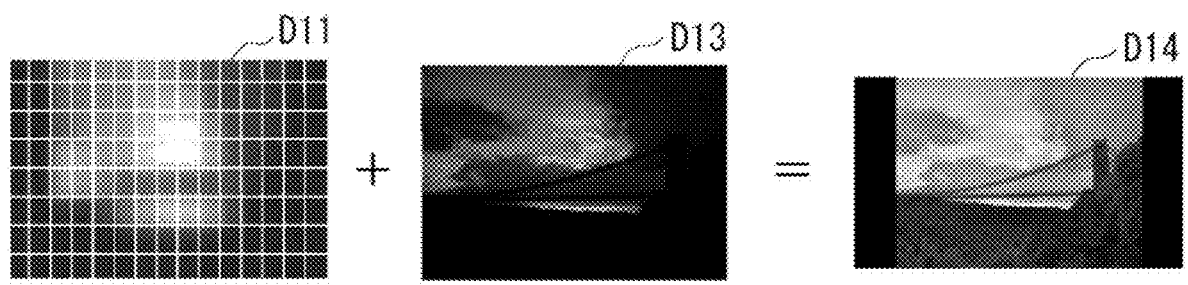
FIG. 5 is a diagram for explaining that a display image is displayed based on luminance value data of a backlight and liquid crystal panel data.

FIG. 5 is a diagram for explaining that a display image is displayed based on luminance value data of a backlight and liquid crystal panel data. The stereoscopic image display apparatus 1 can display the display image D14, by controlling the backlight 110 based on the luminance value data D11 and controlling the liquid crystal panel 20 based on the corrected liquid crystal panel data D13.

Figure 6:
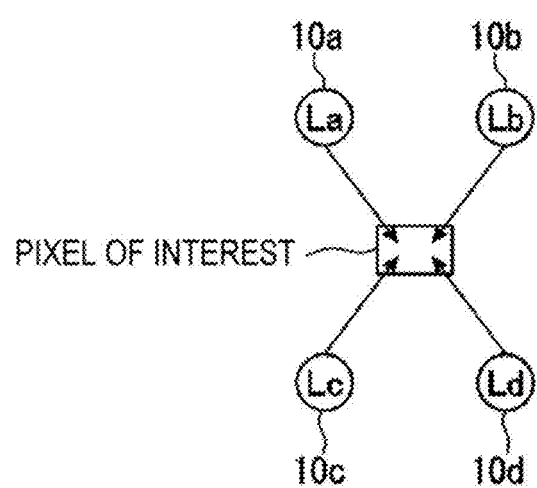
FIG. 6 is a diagram showing a relationship between a plurality of light sources and a pixel of interest.

FIG. 6 is a diagram showing the relationship between a plurality of light sources and a pixel of interest. In the backlight of the local dimming type, the backlight is divided into a plurality of areas, and the emission luminance of the light source of each area is controlled for each area, so the pixels in the liquid crystal panel 20 is affected by the light not only from the light source in the area corresponding to the pixel but also from the light source in the area around the area corresponding to the pixel. Therefore, the luminance of the pixel of interest in the liquid crystal panel 20 is calculated by adding the luminance of the light incident from a plurality of light sources around the pixel of interest. Note that "luminance of a pixel" is luminance corresponding "pixel value of image data" for the pixel. "Pixel value of image data" is a value corresponding to "luminance of pixel", but is not the same value as "luminance of pixel" and is usually a value called "tone value".

For example, as shown in FIG. 6, there are four light sources 10a, 10b, 10c, and 10d around the pixel of interest, which affect the luminance of the pixel of interest. It is assumed that La is the emission luminance of the light source 10a, Lb is the emission luminance of the light source 10b, Lc is the emission luminance of the light source 10c, and Ld is the emission luminance of the light source 10d. Further, it is assumed that the degrees of influence on the luminance of the pixel of interest, that is, the weights are w_ij_a, w_ij_b, w_ij_c, and w_ij_d for the four light sources 10a, 10b, 10c, and 10d, respectively. In this case, the total luminance (influence) L_back_ij estimated from the light received from the backlight 110 of the pixel of interest Xij is expressed by the following Expression 1.

$$L\_back\_ij = \Sigma w\_ij\_k \times Lk \quad \text{(Expression 1)}$$

In the above Expression 1, k=a, b, c, d.

Further, when the luminance corresponding to the pixel value of the pixel of interest in the HDR input image input to the stereoscopic image display apparatus 1 is L_ij, the transmittance T_ij of the liquid crystal panel 20 in the pixel of interest is expressed by the following Expression 2.

$$T\_ij = L\_back\_ij \times 100[\%] \quad \text{(Expression 2)}$$

The stereoscopic image display apparatus 1 controls the interelectrode voltage corresponding to the pixel of interest such that the transmittance of the liquid crystal panel 20 corresponding to the pixel of interest becomes T_ij.

Further, the emission luminance of each light source in the backlight 110 is proportional to, for example, the average of the values of luminance corresponding to the pixel values of the neighboring pixels of the HDR input image in the neighboring pixels in the range where the emission luminance of each light source has an influence. For example, with respect to a light source, the emission luminance of a light source is controlled to be high, when there are many white images in the HDR input image in the neighboring pixels in the range where the emission luminance of the light source has an influence. With respect to a light source, the emission luminance of a light source is controlled to be low, when there are many black images in the HDP input image in the neighboring pixels in the range where the emission luminance of the light source has an influence. Therefore, the emission luminance of the light source corresponding to the pixel of interest is nigher as the sum of the pixel values of the pixels existing around the pixel of interest is higher, and the emission luminance is lower as the sum of the pixel values of the pixels existing around the pixel of interest is lower.

Figure 7:
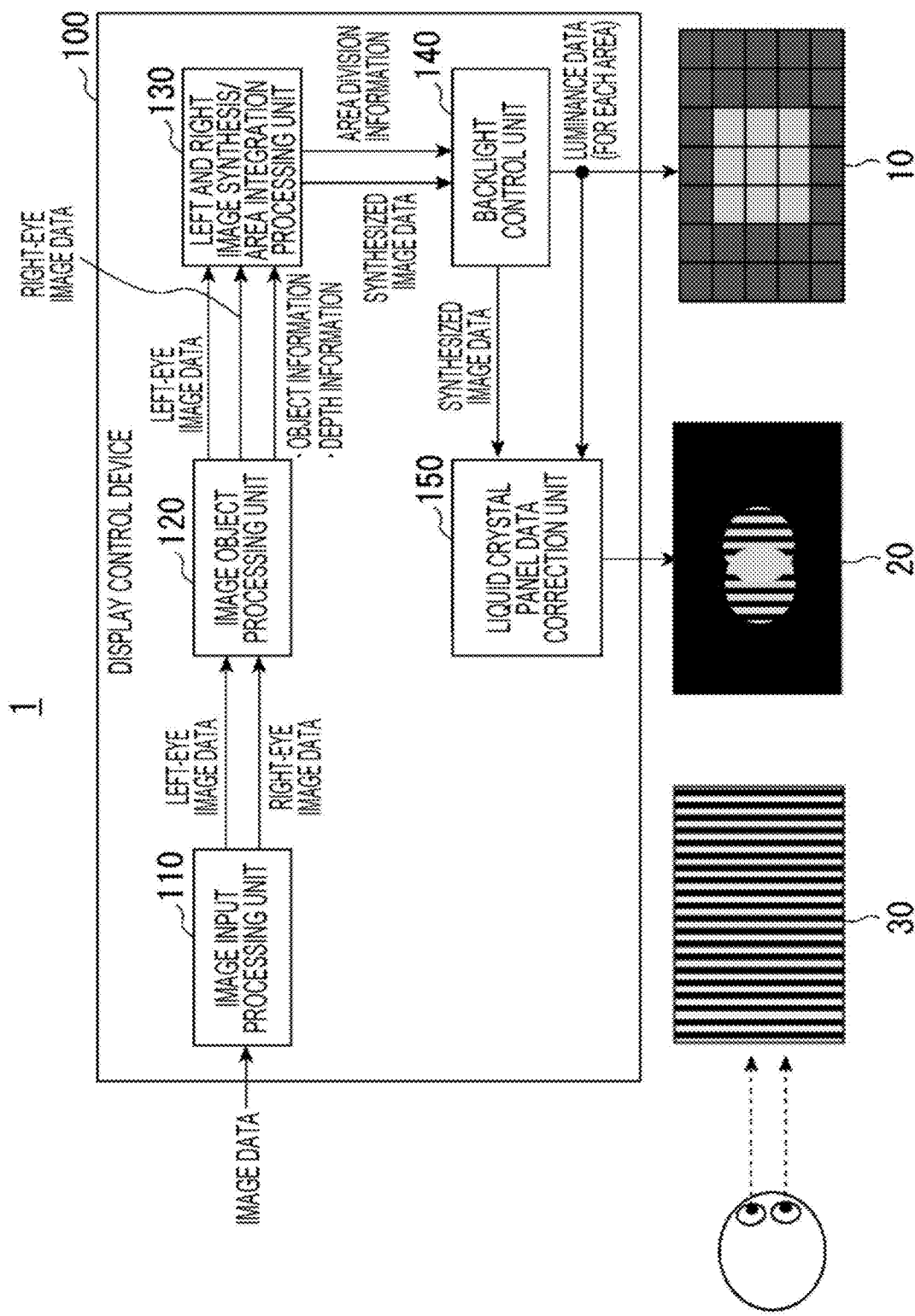
FIG. 7 is a block diagram showing an example of a display control device in a stereoscopic image display apparatus using a liquid crystal display of a local dimming type.
Figure 8:
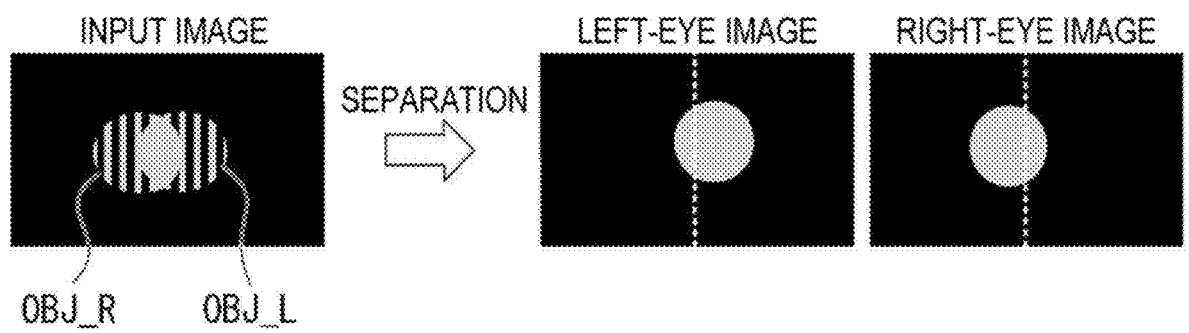
FIG. 8 is a diagram showing an example of a process of separating an input image into a left-eye image and a right-eye image.

Example of Configuration of Stereoscopic Image Display Apparatus 1 in the Case of Using Liquid Crystal Display of Local Dimming Type FIG. 7 is a block diagram showing an example of a display control device in a stereoscopic image display apparatus using a liquid crystal display of a local dimming type. The stereoscopic image display apparatus 1 includes a display control device 100. The display control device 100 controls at least the backlight 10 and the liquid crystal panel 20. The display control device 100 includes, for example, an image input processing unit 110, an image object processing unit 120, a left and right image synthesis/area integration processing unit 130, a backlight control unit 140, and a liquid crystal panel data correction unit 150. Each of the image input processing unit 110, the image object it processing unit 120, the left and right image synthesis/area integration processing unit 130, the backlight control unit 140, and the liquid crystal panel data correction unit 150 is realized by a hardware processor such as a central processing unit (CPU) executing a program (software). In addition, some or all of these components may be realized by hardware (including circuitry) such as a large scale integration (LSI), an application specific integrated circuit (ASIC), a field-programmable gate array (FPGA), a graphics processing unit (CPU), or may be realized by cooperation of software and hardware. The program may be previously stored in a storage device such as a flash memory of the stereoscopic image display apparatus 1, but it is not limited thereto, and the program may be stored in a detachable storage medium such as a DVD or a CD-ROM, and installed in the HDD or the flash memory by the medium being attached to the drive device.

Figure 18:
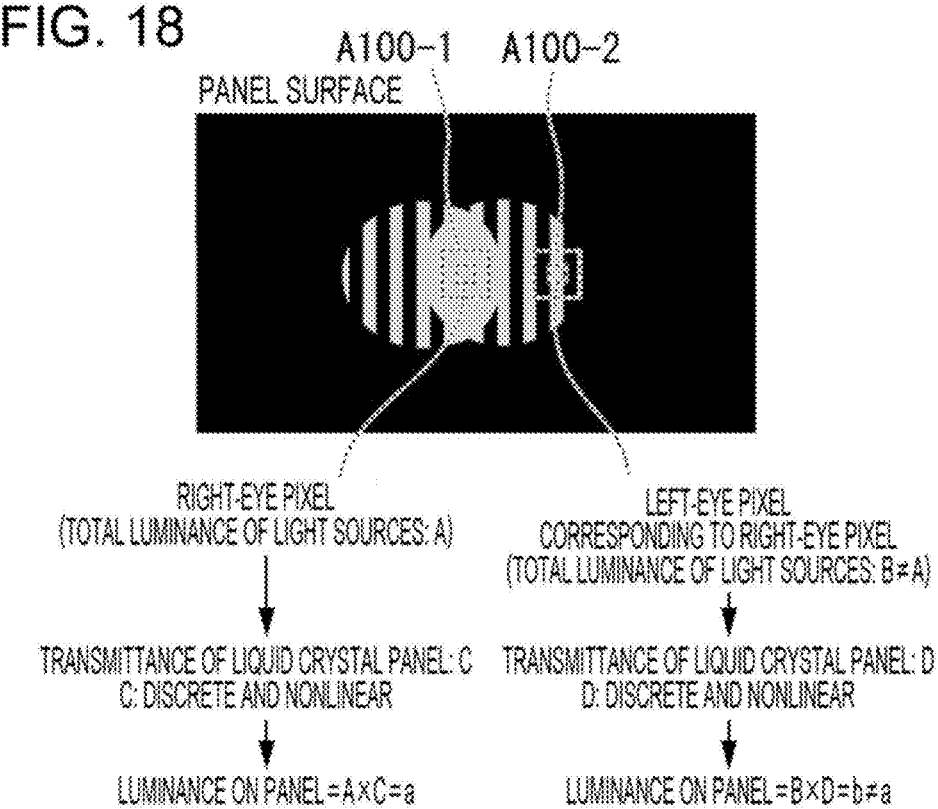
FIG. 18 is a diagram for explaining the luminance of the right-eye pixel and the left-eye pixel on the liquid crystal panel surface, in screen display without the parallax barrier of the right-eye image and the left-eye image subjected to the local dimming control in the related art in the case where there is no parallax barrier.
Figure 19:
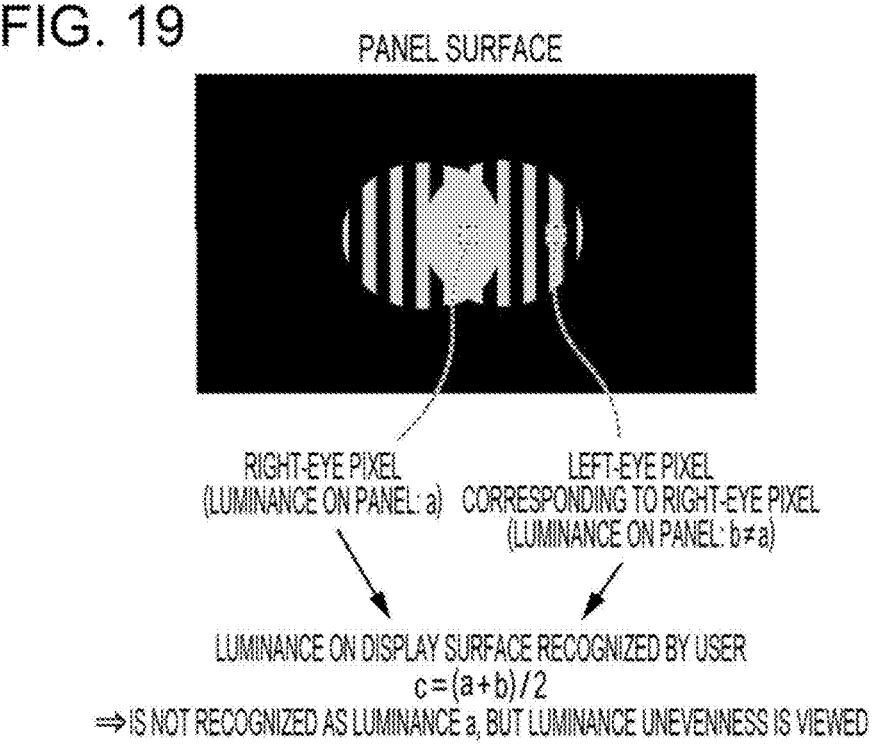
FIG. 19 is a diagram for explaining the luminance of a pixel perceived by a user when a stereoscopic image is displayed.

The image input processing unit 110 is, for example, an interface circuit that inputs image data from the outside. The image input processing unit 110 separates the image of one frame included in the input image data into a left-eye image and a right-eye image. FIG. 18 is a diagram showing an example of a process of separating an input image into a left-eye image and a right-eye image. The image input processing unit 110 outputs the left-eye image data representing the left-eye image and the right-eye image data representing the right-eye image to the image object processing unit 120. The image format of the image data may be, for example, a format such that the left-eye image is displayed in the left region of the image of one frame of the image data input at 60 Hz and the right-eye image is displayed in the right region of the image, but it is not limited thereto. For example, similar to the display image, it may be a format in which the left-eye image is assigned to the even number dot and the right-eye image is assigned to the odd number dot.

The image object processing unit 120 determines the identity of the image objects included in both the left-eye image and the right-eye image based on the left-eye image data and the right-eye image data. An image object is an example of a display object, and represents a unit displayed by an image of a background or an object included in image data. For example, the image object processing unit 120 may recognize the same image object by pattern matching, but it is not limited thereto, and various image processing methods may be used. The image object processing unit 120 associates the pixels in the left-eye image with the pixels in the right-eye image in the same image object.

The image object processing unit 120 estimates the depths of the pixel in the left-eye image and the pixel in the right-eye image that are associated with each other. For example, the image object processing unit 120 estimates the depth according to a deviation between the position of the image object in the left-eye image and the position of the image object in the right-eye image. The image object processing unit 120 associates depth information with the pixel in the left-eye image and the pixel in the right-eye image that are associated with each other. The image object processing unit 120 stores the left-eye image data, the right-eye image data, information representing the pixel in the left-eye image and the pixel in the right-eye image that are associated with each other, and the depth information to the left and right image synthesis/area integration processing unit 130.

The left and right image synthesis/area integration processing unit 130 performs a synthesis process for placing each of the left-eye image data and the right-eye image data as one frame of image data to be displayed on the liquid crystal panel 20. The left and right image synthesis/area integration processing unit 130 outputs the synthesized image data to the backlight control unit 140. Further, the left and right image synthesis/area integration processing unit 130 determines the unit of control in the local dimming control. Specifically, the left and right image synthesis/area integration processing unit 130 performs a process of integrating the areas based on the information representing the pixel in the left-eye image and the pixel in the right-eye image that are associated with each other, and the depth information. Further, the left and right image synthesis/area integration processing unit 130 outputs the area division information as a result of the process of integrating the areas, to the backlight control unit 140. The area division information is, for example, information representing a unit of control in the local dimming control. That is, although the minimum unit of backlight control is one area, when a plurality of areas are integrated into one area, the area division information is information for linking the plurality of areas as one unit of control.

Figure 9:
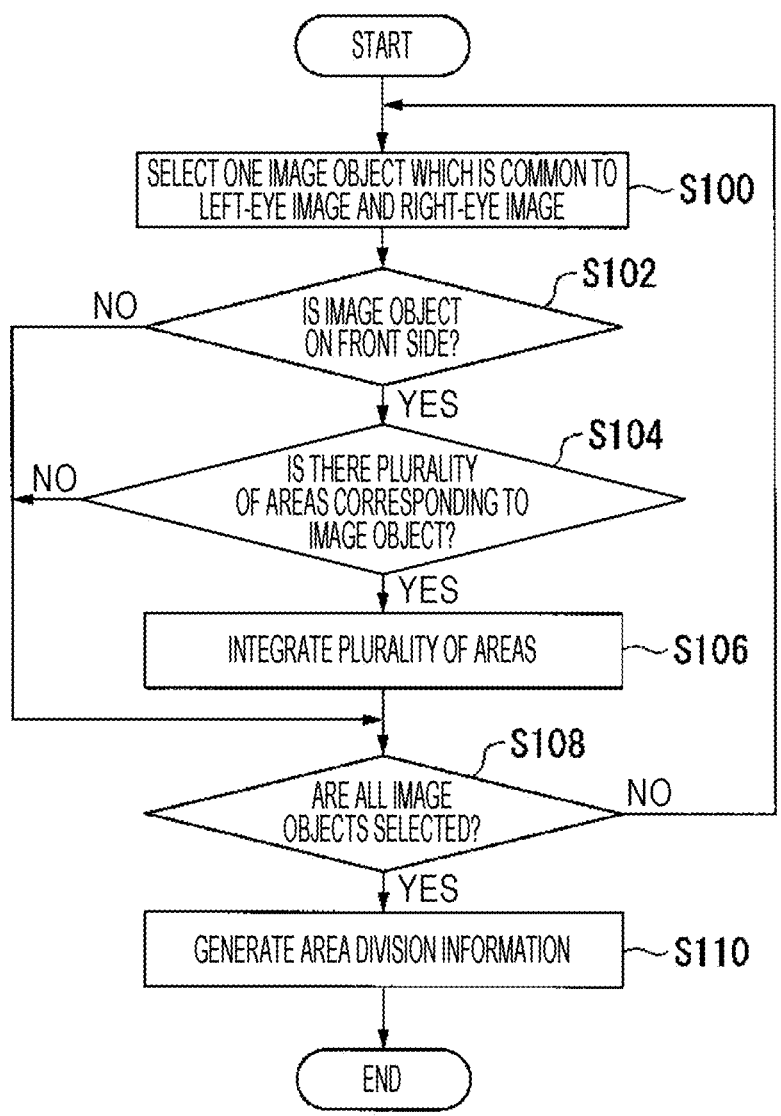
FIG. 9 is a flowchart showing an example of a flow of a process of integrating areas.

FIG. 9 is a flowchart showing an example of the flow of the process of integrating areas. First, the left and right image synthesis/area integration processing unit 130 selects one image object which is determined to be identical between the left-eye image and the right-eye image, and which is common to the left-eye image and the right-eye image (Step S100). Next, the left and right image synthesis/area integration processing unit 130 determines whether or not the image object is displayed on the front side of the display surface (reference surface), based on the depth information of the selected image object (step S102). When the image object is displayed on the front side of the display surface (YES in step S102), the left and right image synthesis/area integration processing unit 130 advances the process to step S104. When the image object is not displayed on the front side of the display surface (NO in step S102), the left and right image synthesis/area integration processing unit 130 advances the process to step S108.

In step S104, the left and right image synthesis/area integration processing unit 130 determines whether or not there are a plurality of areas corresponding to the image object. The left and right image synthesis/area integration processing unit 130 recognizes the area corresponding to the image object by comparing the position of the image object in the screen with the position of each area. When there is a plurality of areas corresponding to the image object (YES in step S104), the left and right image synthesis/area integration processing unit 130 integrates the plurality of areas and sets them as one area (step S106). When there is not a plurality of areas corresponding to the image object (NO in step S104), the left and right image synthesis/area integration processing unit 130 advances the process to step S108.

In step S108, the left and right image synthesis/area integration processing unit 130 determines whether or not all the image objects have been selected. When all the image objects have not been selected, the left and right image synthesis/area integration processing unit 130 returns the process to step S100. When all the image objects have been selected, the left and right image synthesis/area integration processing unit 130 generates area division information (step S110).

FIGS. 10A to 10B are diagrams for explaining an example of the process for integrating areas. In a state where the areas are not integrated, areas A1 of a predetermined size are arranged in a matrix form in the image P. As shown in FIG. 10A, when the image P has the image object OBJ_L included in the right-eye image and the image object OBJ_R included in the left-eye image, as the same image object, the left and right image synthesis/area integration processing unit 130 integrates a plurality of areas A1 having a light source affecting the image object OBJ_L and the image object OBJ_R as one area A2. As a result, as shown in FIG. 10B, the left and right image synthesis/area integration processing unit 130 can control the emission luminance of each area A1, with each area A1 as one unit of control. On the other hand, as shown in FIG. 10B, the left and right image synthesis/area integration processing unit 130 can control the emission luminance of the integrated region A2, with one integrated region A2 obtained by integrating nine areas A1 as one unit (region) of control.

Specifically, as shown in FIG. 10B, for example, the left and right image synthesis/area integration processing unit 130 manages the unit of control by assigning numbers to each area. It is assumed that there are 35 areas as the smallest unit of control. In the local dimming control of the comparative example to which the present embodiment is not applied, 35 areas are independently controlled to control the emission luminance of each area. On the other hand, in the local dimming control of the embodiment, when an object which is common to the right-eye image and the left-eye image is in front of the di splay surface, nine areas 10, 11, 12, 17, 18, 19, 24, 25, and 26 corresponding to the object are integrated into one unit of control (integrated region A2) and the emission luminance of the integrated region A2 is controlled. For areas that are not integrated, emission luminance is controlled independently for each area.

For example, in the case of controlling the emission luminance of the area 1, the backlight control unit 140 calculates the luminance value proportional to the value obtained by averaging the luminance corresponding to the pixel value of each pixel of the image data, for pixels included in the area 1, as the emission luminance value of the area 1. The backlight control unit 140 controls the emission luminance of the light source which affects the area 1 to be the calculated emission luminance value of the area 1. For example, when controlling the emission luminance of the integrated region A2 in which nine areas are integrated, the backlight control unit 140 calculates the value proportional to the value obtained by averaging the luminance corresponding to the pixel value of each pixel of the image data for the pixels included in the areas 10, 11, 12, 17, 18, 19, 24, 25, and 26, as the emission luminance value of the integrated region A2. The backlight control unit 140 controls the emission luminance of the light source which affects the integrated region A2 to be the calculated emission luminance value of the integrated region A2. As a result, the values of emission luminance of the light sources of the areas 10, 11, 12, 17, 18, 19, 24, 25 and 26 are the same, and therefore if the image data pieces of the pixels of the liquid crystal panel 20 the corresponding to the areas 10, 11, 12, 17, 18, 19, 24, 25 and 26 are the same, the values of transmittance of the pixels of the liquid crystal panel 20 corresponding to the areas 10, 11, 12, 17, 18, 19, 24, 25 and 26 are estimated to be the same.

Further, in the present example, A2 to be integrated into one area is limited to one, but even in the case where there are plural A2, it is also possible to control each A2 to have the same light emission luminance in the same manner, with each A2 as one area.

In addition, a plurality of areas to be to into one is determined according to an image for each image, and is controlled for each display image.

From the left and right image synthesis/area integration processing unit 130, the backlight control unit 140 receives the synthesized image data and area division information output from the left and right image synthesis/area integration processing unit 130. FIG. 11 is a diagram showing an example of image data after synthesis. Based on the area division information, the backlight control unit 140 specifies each area and the light source corresponding to one integrated unit (region) of control. The backlight control unit 140 determines the emission luminance value of the specified light source, based on the image data. The backlight control unit 140 outputs the luminance value data corresponding to the determined emission luminance value to each light source of the backlight 10. Thus, the backlight control unit 140 adjusts the emission luminance of each light source.

By this control, the luminance of pixels in the same image object on the left and right is constant.

The liquid crystal panel data correction unit 150 generates liquid crystal panel data, based on the image data, and corrects the generated liquid crystal panel data, based on the luminance value data of each light source of the backlight. The liquid crystal panel data correction unit 150 outputs the corrected liquid crystal panel data to the liquid crystal panel 20. Thus, the liquid crystal panel data correction unit 150 adjusts the transmittance of the liquid crystal panel 20 for each pixel.

In the above description of FIGS. 10A to 10B, the case where there is one display object common to the right-eye image and the left-eye image has been described, but when there is a plurality of display objects common to the right-eye image and the left-eye image, the left and right image synthesis/area integration processing unit 130 sets a plurality of integrated regions A2.

In addition, in the case where the moving image is displayed on the liquid crystal display, when the size of the display object which is common to the right-eye image and the left-eye image changes, the left and right image synthesis/area integration processing unit 130 also changes the integrated region A2 according to the change of the size.

Effect of First Embodiment

As described above, the stereoscopic image display apparatus 1 of the first embodiment includes a plurality of light sources, a liquid crystal panel 20 that changes transmittance of light emitted by the light source, and a parallax barrier 30 that allows light transmitted through the liquid crystal panel 20 to be viewed as a right-eye image and a left-eye image, and integrates a plurality of areas of the backlight affecting the pixels corresponding to the same display object displayed on the display surface into one area, and controls the emission luminance of each light source of the backlight 10, for each area including the other areas. A control unit (100) that controls the transmittance of the liquid crystal panel 20 for each pixel such that the luminance of the pixel on the display surface is a desired luminance, based on the emission luminance value of each light source of the backlight is included. Thus, according to the stereoscopic image display apparatus 1 of the first embodiment, the influence of the emission luminance on the pixels of the liquid crystal panel 20 in the integrated region are uniform without unevenness, by setting a plurality of areas corresponding to pixels of the same display object to one integrated region, so it is possible to suppress unevenness in the control of the transmittance of the liquid crystal panel 20, and it is possible to suppress the luminance unevenness of the image on the display surface. As a result, according to the stereoscopic image display apparatus 1 of the first embodiment, luminance unevenness in the stereoscopic image can be suppressed in the liquid crystal display of the local dimming type in which a stereoscopic image is displayed by the parallax barrier method.

Figure 12A:
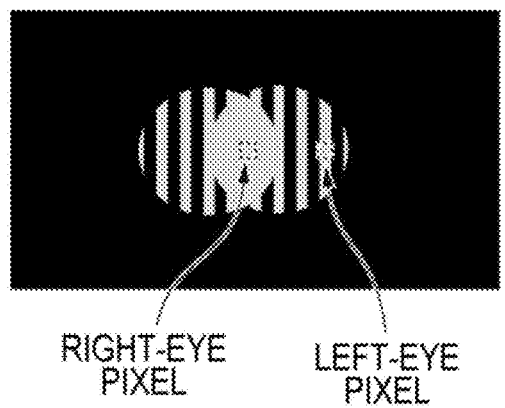
FIGS. 12A to 12C are diagrams for explaining emission luminance of each area of a backlight when an input image is input for explaining an effect of the present embodiment of the first embodiment.
Figure 12B:
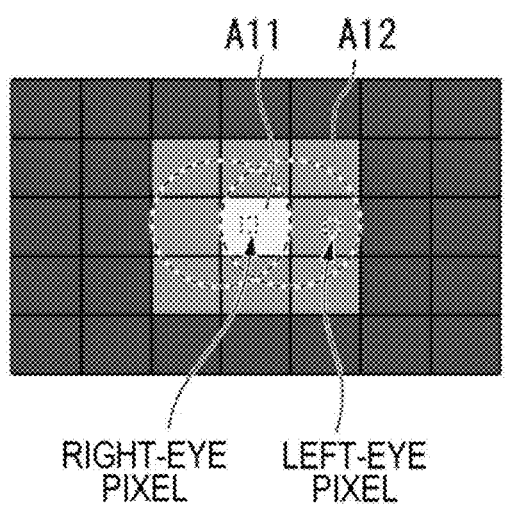
Figure 12C:
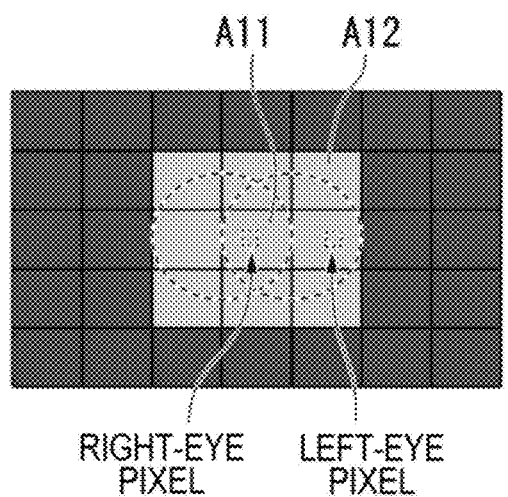
Figure 13A:
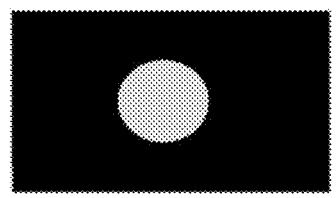
FIGS. 13A to 13C are diagrams for explaining the effect of the first embodiment.
Figure 13B:
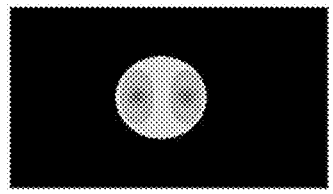
Figure 13C:
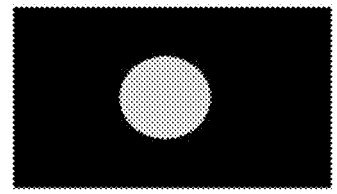

FIGS. 12A to 12C are diagrams for explaining emission luminance of each area of a backlight when an input image is input for explaining an effect of the present embodiment of the first embodiment. FIG. 12A is a diagram showing an image displayed on the liquid crystal panel 20 without the parallax barrier 30. FIG. 12B is a diagram showing the emission luminance of each area when the backlight is controlled by the local dimming control method in the related art, in the comparative example. FIG. 12C is a diagram showing the emission luminance of each area including the unified area when the backlight is controlled by the local dimming control method of the first embodiment. For the sake of explanation, FIGS. 12A to 12C largely show pixels. FIGS. 13A to 13C are diagrams for explaining the effect of the first embodiment.

The stereoscopic image display apparatus of the comparative example determines the emission luminance of the light source corresponding to each area, for one image in which the right-eye image and the left-eye image are synthesized, that is, one image such as the synthesized image in FIG. 11, by the local dimming control method in the related art, that is, a method of controlling the emission luminance of each light source, from the luminance corresponding to the pixel value of the image with respect to the pixel in the range that the light source of each area affects, in the area division of the predetermined backlight, and determines the transmittance of the liquid crystal panel, based on the emission luminance value of the light source corresponding to each area. As shown in FIG. 12A, in the stereoscopic image display apparatus of the comparative example, the pixels around the right-eye pixel are gray in the round image, and the emission luminance of each light source contributing to the right-eye pixel is highly estimated. On the other hand, since the pixels around the left-eye pixel corresponding to the right-eye pixel are black in the background image, and the emission luminance of each light source contributing to the left-eye pixel is low estimated. Therefore, as shown in FIG. 12B, the light emission luminance of each light, source increases in the area A11 in which the right-eye image and the left-eye image overlap, and is low in the area A12 around the area A11.

In the liquid crystal panel 20, the transmittance of the pixel corresponding to the display pixel is controlled, according to the sum of luminance estimated from the light emitted from each light source affecting the display pixel such that the luminance of the display pixel becomes the luminance corresponding to each pixel value of the image data. As shown in FIG. 13A, the pixel values in the round image indicated by the image data of the gray color circle image represent uniform luminance, but are controlled by the liquid crystal panel data correction unit such that the transmittance of the liquid crystal panel 20 corresponding to the area where the emission luminance of the light source of the backlight 10 is low and the transmittance of the liquid crystal panel 20 corresponding to the area where the emission luminance of the light source of the backlight 10 is high, and the luminance on the display surface is controlled to be the luminance corresponding to the pixel value indicated by the image data. However, since the transmittance of the liquid crystal panel cannot be controlled continuously, and the controllable range thereof is also limited, the luminance on the display surface gradually changes in each region. When the display image is observed through the parallax barrier 30, a gradual change in luminance results in an unnatural change in luminance due to a mixture of left and right screens, so as shown in FIG. 13B, unevenness uniformly appears in a gray color circle image.

In the case of displaying a round image as a stereoscopic image by the parallax barrier method, the left-eye pixels and the right-eye pixels are arranged, and in many cases the adjacent pixels may not be the same part of the image object. As shown in FIG. 3, when there is an object o2 in front of the display surface, pixels adjacent to a certain pixel in the object o2 included in the left-eye image are the background of the right-eye image, and pixels adjacent to a certain pixel in the object in the right-eye image are the background of the left-eye image. Therefore, even if the luminance value corresponding to the pixel value of the image data of the object is determined with respect to the pixel corresponding to the object in the right-eye image or the left-eye image and corresponding to the background in the reverse image, the emission luminance of each light source of the determined backlight changes, according to the luminance corresponding to the pixel value of the background image data. Therefore, in the stereoscopic image display apparatus of the comparative example, the transmittance of the liquid crystal panel 20 is different between the right-eye pixel and the left-eye pixel in the round image although the round image has a uniform gray color. In addition, the transmittance of liquid crystal panel can only be controlled discretely and nonlinearly, and the controllable range is also limited. As a result, even if it is desired to display a round image having uniform gray gradient luminance shown in FIG. 13A, as shown in FIG. 13B, the luminance of the center portion of the round image is high and the luminance of the end portion of the round image is low.

In the case of the three-dimensional display by the parallax barrier method, when the object position in the right-eye image and the object position in the left-eye image are different depending on the depth of the object to be displayed, as shown in FIG. 3, an object image is displayed on the display surface by being deviated by the parallax between the display surface and the depth (pop-out) of the object. As shown in FIG. 3, as compared with a two-dimensional image, when a three-dimensional image is displayed, the angle of the line of sight with respect to the display surface becomes large, so ease of receiving the viewing angle characteristics also causes unevenness to be easily seen.

On the other hand, the stereoscopic image play apparatus 1 of the first embodiment unifies the backlight areas affecting the pixels of the liquid crystal panel 20 corresponding to the same display object displayed on the display surface into one area, controls the emission luminance of each light source for each area including the other areas, and controls the transmittance of the pixels on the liquid crystal panel 20 for each pixel, based on the emission luminance value of each light source, by the liquid crystal panel data correction unit. Consequently, the stereoscopic image display apparatus 1 of the first embodiment can control the transmittance of the pixels of the liquid crystal panel 20 at the pixels corresponding to the pixel values of the round image data displaying the uniform luminance to the same value, and it is possible to suppress differences in luminance on the display surface in the entire round image as shown in FIG. 12C. As a result, according to the stereoscopic image display apparatus 1 of the first embodiment, luminance unevenness in a stereoscopic image can be suppressed. That is, according to the stereoscopic image display apparatus 1 of the first embodiment, as shown in FIG. 13C, it is possible to display an image in which the luminance difference is suppressed between the center portion and the end portion of the round image.

Second Embodiment

Figure 14:
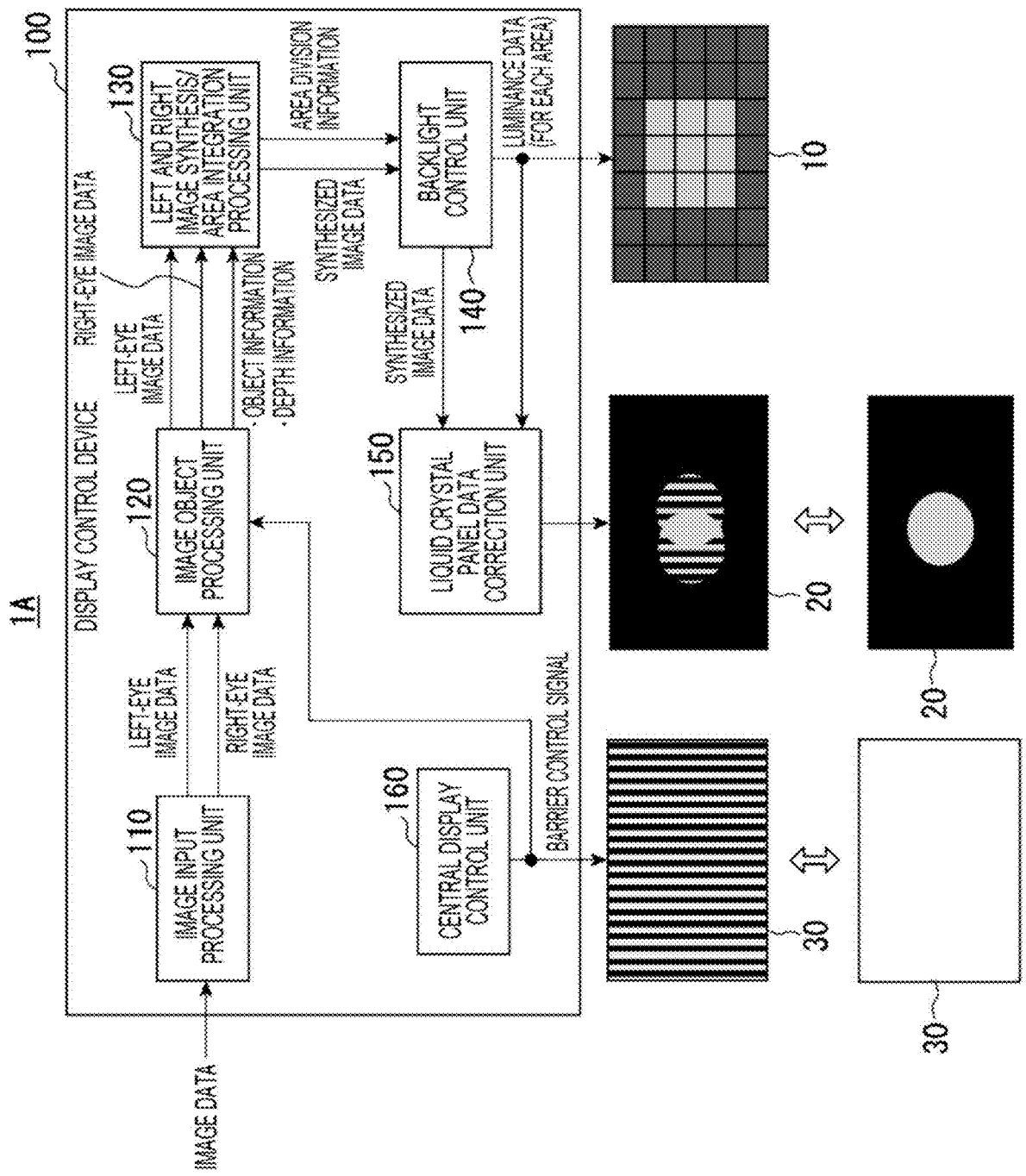
FIG. 14 is a diagram showing a configuration example of a stereoscopic image display apparatus according to a second embodiment.

FIG. 14 is a diagram showing a configuration example of a stereoscopic image display apparatus according to a second embodiment. The stereoscopic image display apparatus 1A according to the second embodiment is different from the stereoscopic image display apparatus 1 according to the first embodiment in that it includes a central display control unit 160 that controls the parallax barrier 30. This point will be mainly described below.

The central display control unit 160 is realized, for example, by a hardware processor such as a CPU executing a program (software). In addition, some or all of these constituent elements may be realized by hardware (circuit unit; including circuitry) such as LSI, ASIC, FPGA, and GPU, or realized by cooperation of software and hardware. The central display control unit 160 determines whether to display a two-dimensional image a three-dimensional for example, based on a user's operation, but it is not limited thereto. The central display control unit 160 may determine whether to display a two-dimensional image or a three-dimensional image based on the type of image data.

When the stereoscopic image display apparatus 1A displays a two-dimensional image, the central display control unit 160 displays the entire surface of the parallax barrier 30 in a transparent manner without displaying the barrier line by the parallax barrier 30. When a barrier control signal that does not display a barrier line is supplied, the parallax barrier 30 does not display the barrier line. When the stereoscopic image display apparatus 1A displays a three-dimensional image, the central display control unit 160 causes the parallax barrier 30 to display the barrier line. When a barrier control signal for displaying a barrier line is supplied, the parallax barrier 30 displays the barrier line.

When a barrier control signal that does not display a barrier line is supplied, the image object processing unit 120 outputs image data for displaying a two-dimensional image, instead of the left-eye image data, the right-eye image data, the object information, and the depth information, to the right and left image combining and area integration processing unit 130.

As described above, according to the stereoscopic image display apparatus 1A of the second embodiment, when displaying a three-dimensional image, similarly to the first embodiment, in the case of displaying a stereoscopic image by the parallax barrier method, the luminance unevenness in the stereoscopic image can be suppressed in the liquid crystal display having the backlight performing the local dimming control.

Third Embodiment

Figure 15:
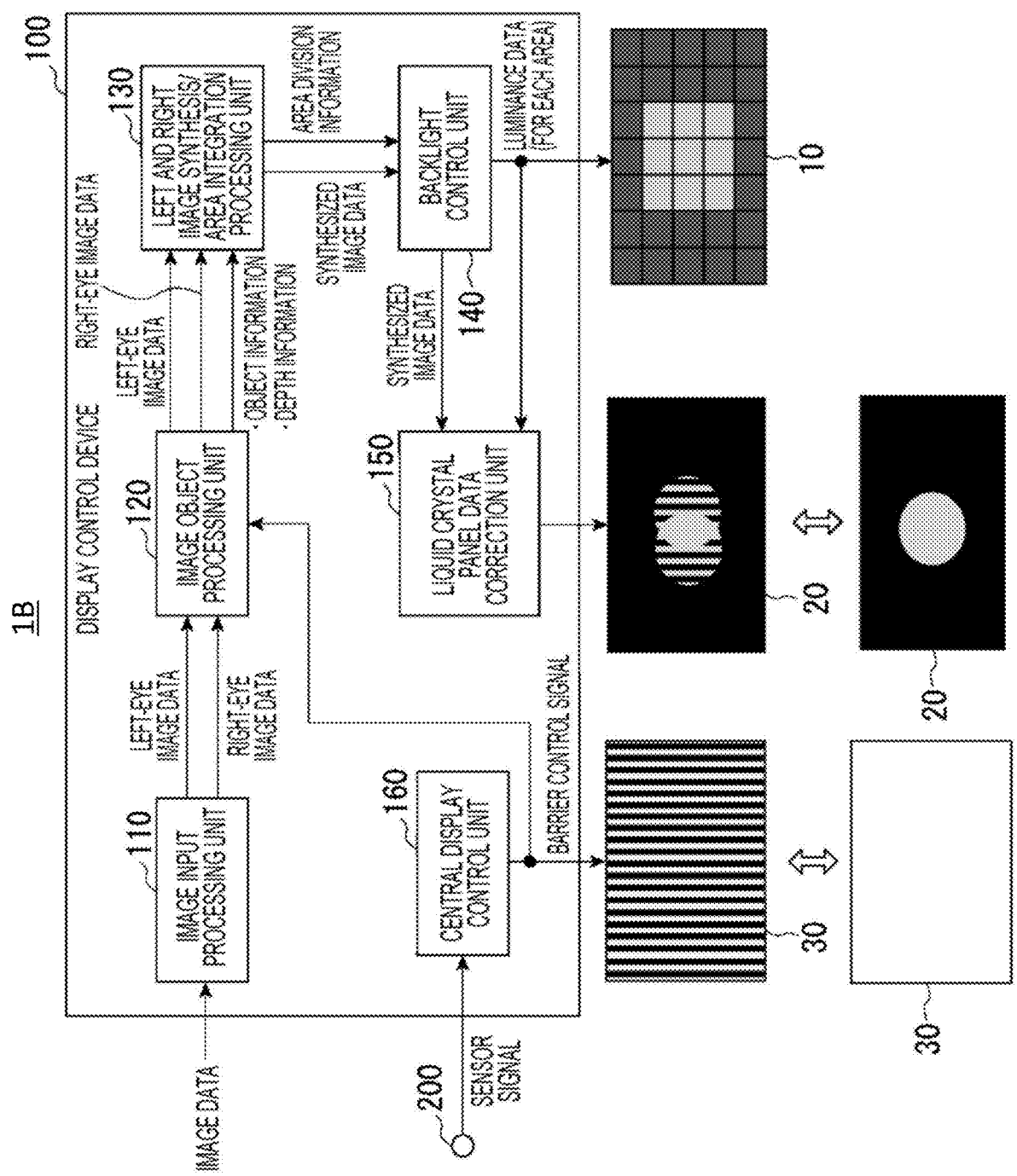
FIG. 15 is a diagram illustrating a configuration example of a stereoscopic image display apparatus according to a third embodiment.
Figure 16A:
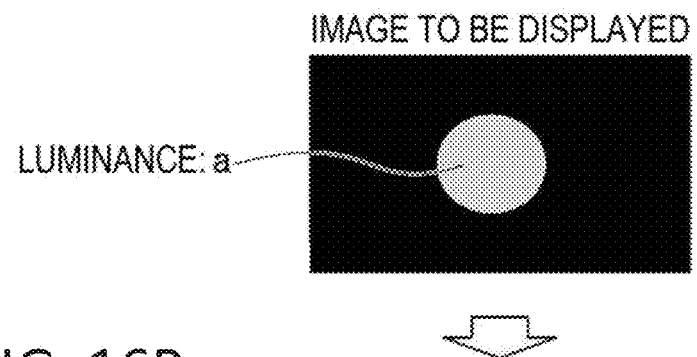
FIGS. 16A to 16B are diagrams showing an example of a stereoscopic image in the related art.
Figure 16B:
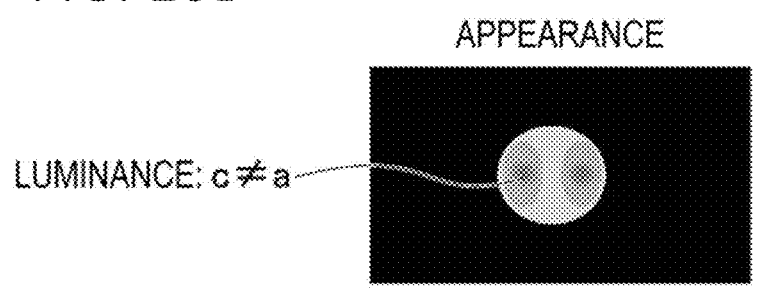
Figure 17:
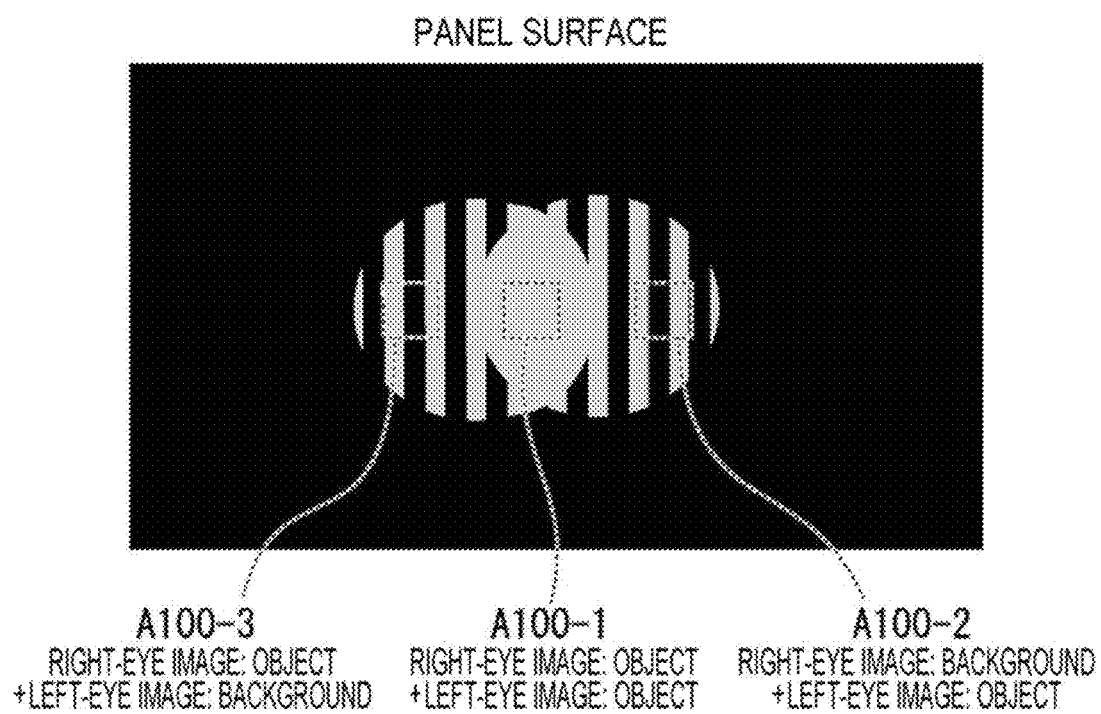
FIG. 17 is a diagram showing screen display without the parallax barrier of the right-eye image and the left-eye image subjected to the local dimming control in the related art in the case where there is no parallax barrier.

FIG. 15 is a diagram showing a configuration example of a stereoscopic image display apparatus according to a third embodiment. A stereoscopic image display apparatus 1B according to the third embodiment is different from the first and second embodiments in that it includes a sensor 200 that acquires information for detecting the position of the user's eye and moves the barrier line based on the detection result of the sensor 200. This point will be mainly described below.

The sensor 200 is, for example, a compact camera. The sensor 200 is provided, for example, in a casing of the stereoscopic image display apparatus 1B, and images the region including the eyes of the user who views the image displayed on the stereoscopic image display apparatus 1B. The sensor 200 outputs the captured image to the central display control unit 160. The central display control unit 160 detects the positions of the user's eyes, based on the image acquired from the sensor 200. When the user views the display surface at the detected position, the central display control unit 160 controls the position of the barrier line such that the left-eye image is viewed only with the user's left eye and the right-eye image is viewed only with the user's right eye. The central display control unit 160 generates a barrier control signal to control the position of the barrier line and supplies the generated barrier control signal to the parallax barrier 30. The parallax barrier 30 moves the barrier line according to the barrier control signal.

When the stereoscopic image display apparatus 1A displays a two-dimensional image, as in the second embodiment, the central display control unit 160 may display the entire surface of the parallax barrier 30 in a transparent manner without displaying the barrier line by the parallax barrier 30. When the stereoscopic image display apparatus 1A displays a three-dimensional image, the central display control unit 160 adjusts the position of the barrier line by the parallax barrier 30 based on the line of sight of the user to display the barrier line.

The central display control unit 160 outputs information for adjusting the arrangement of the left-eye image and the right-eye image to the image object processing unit 120, based on the position of the eye of the user. For example, when the barrier line is shifted from the reference position based on the position of the user's eye, the central display control unit 160 generates information indicating the amount of deviation of the barrier line and outputs the information to the image object processing unit 120. The image object processing unit 120 adjusts the arrangement of the left-eye image and the right-eye image based on the shift amount of the barrier line.

As described above, according to the stereoscopic image display apparatus 1B of the third embodiment, when displaying a three-dimensional image, similarly to the first embodiment, in the case of displaying a stereoscopic image by the parallax barrier method, the luminance unevenness in the stereoscopic image can be suppressed in the liquid crystal display having the backlight performing the local dimming control.

Note that the disclosure can also be implemented in the following aspects.

(1) A stereoscopic image display apparatus including:
an illumination unit in which a plurality of light sources are disposed;
a transmission unit that transmits light arriving from the illumination unit for each pixel based on an input image, and changes transmittance of the light for each pixel;
a barrier unit that allows the light transmitted through the transmission unit to be viewed as a right-eye image and a left-eye image; and
a control unit that divides an area of the illumination unit based on the input image, the area including at least one light source out of the plurality of light sources, and controls emission luminance of the light source for each area.

(2) The stereoscopic image display apparatus according to (1), in which the control unit sets an area in which out of the plurality of light sources, light sources affecting the luminance of a pixel group in the transmission unit corresponding to a display object common to the right-eye image and the left-eye image are disposed as one integrated area, controls the emission luminance of the light source in the integrated area to be uniform, and controls the emission luminance of the light source of the area other than the integrated area such that the emission luminance is uniform for each area independently of the integrated area.

(3) The stereoscopic image display apparatus according to (1) or (2), in which the control unit includes
an image input processing unit that separates the input image into a right-eye image and a left-eye image;
an image object processing unit that recognizes an object common to the right-eye image and the left-eye image which are separated by the image input processing unit;
a left and right image synthesis/area integration processing unit that divides the area of the illumination unit, based on the right-eye image, the left-eye image, and information on the object recognized by the image object processing unit, and generates composite image data obtained by synthesizing the right-eye image and the left-eye image;
a backlight control unit that sets an area affecting pixels of the transmission unit corresponding to an object included in the light-eye image and an area affecting pixels of the transmission unit corresponding to a display object included in the left-eye image corresponding to the right-eye image as one same area, and controls the plurality of light sources for each area such that emission luminance of the light sources in the area is uniform within the area; and
a liquid crystal panel data correction unit that controls transmittance of pixels of the transmission unit for each pixel, based on the composite image data and the emission luminance value of each light source controlled by the backlight control unit.

(4) The stereoscopic image display apparatus according to any one of (1) to (3), in which when the image object is an image object viewed closer to a user than the reference surface, the control unit integrates the areas for each image object and controls the emission luminance of the light source of the integrated area to be uniform for each area.

(5) The stereoscopic image display apparatus according to any one of (1) to (3), further including: a central display control unit that controls the barrier unit to bar the light transmitted through the transmission unit in a case where the input image is a stereoscopic image, and not to bar the light transmitted through the transmission unit in a case where the input image is not the stereoscopic image.

(6) The stereoscopic image display apparatus according to (4), further including: a sensor that detects a user, in which the control unit controls the barrier unit to change a position at which the light transmitted through the transmission unit is barred, based on a result detected by the sensor.

(7) A display method of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be viewed as a right-eye image and a left-eye image, the method including dividing an area of the illumination unit based on the input image, the area including at least one light source out of the plurality of light sources, and controlling emission luminance of the light source for each area.

(8) A program of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be viewed as a right-eye image and a left-eye image, the program causing a computer of the liquid crystal display to divide an area of the illumination unit based on the input image, the area including at least one light source out of the plurality of light sources, and control emission luminance of the light source for each area.

In addition, the program operating in the display control device 100 according to an aspect of the disclosure may be one or a plurality of programs for controlling a processor such as a CPU (a program causing a computer to function) in order to realize the functions described in the above-described embodiments and modification examples related to an aspect of the disclosure. The information handled by each of these devices may be temporarily stored in the RAM at the time of processing, and thereafter be stored in various storages such as a flash memory and an HDD, and read out, modified and written by the CPU.

Further, a part or all of each display control device 100 in each of the above-described embodiments and modification examples may be realized by a computer having one or a plurality of processors. In that case, it may be realized by a program for realizing the control function being recorded on a computer readable recording medium, and the program recorded on the recording medium being read and executed by the computer system.

The "computer system" referred to here is a computer system incorporated in the display control device 100 and includes hardware such as an OS and peripheral devices. Further, "computer-readable recording medium" refers to a storage device such as a flexible disk, a magneto-optical disk, a portable medium such as a ROM and a CD-ROM, and a hard disk built in a computer system.

Furthermore, the "computer-readable recording medium" may include a medium that dynamically holds a program for a short period of time, such as a communication line for transmitting a program through a network such as the Internet or a communication line such as a telephone line, and a medium that holds a program for a certain period of time, such as a volatile memory inside a computer system serving as a server or a client in that case. Further, the program may be intended to realize a part of the above-described functions, and may be intended to realize the above-described functions by combining them with the program already recorded in the computer system.

Further, a part or all of each display control device 100 in each of the above-described embodiments and modification examples may be realized as an LSI which is typically an integrated circuit, or may be realized as a chip set. In addition, functional blocks of the display control device 100 in each of the above-described embodiments and modification examples may be individually formed into chips, or part or all of them may be integrated into chips. In addition, a method of forming an integrated circuit is not limited to LSI, and it may be realized by a dedicated circuit and/or a general-purpose processor. In addition, when advances in semiconductor technology have led to the emergence of integrated circuit technology that can replace LSIs, it is also possible to use an integrated circuit according to the technology.

Although the embodiments and modification examples have been described in detail with reference to the drawings as an aspect of the disclosure, specific configurations are not limited to each of the embodiments and modification examples, and design changes and the like within the scope not deviating from the gist of the disclosure are also included. In an embodiment of the disclosure, various modifications are possible within the scope disclosed in claims, and an embodiment obtained by suitably combining the technical means respectively disclosed in different embodiments is included in the technical scope of the disclosure. Further, configurations in which the elements described in the above embodiments and modification examples and having the same effect are replaced are included.

For example, an aspect of the disclosure may be realized by combining some or all of the above-described embodiments and modification examples.

The present disclosure contains subject matter related to that disclosed in Japanese Priority Patent Application JP 2018-039887 filed in the Japan Patent Office on Mar. 6, 2018, the entire contents of which are hereby Incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic image display apparatus comprising:
   an illumination unit in which a plurality of light sources are disposed;
   a transmission unit that transmits light arriving from the illumination unit for each pixel based on an input image, and changes transmittance of the light for each pixel;
   a barrier unit that allows the light transmitted through the transmission unit to be simultaneously viewed as a right-eye image and a left-eye image; and
   a control unit that
      sets an integrated area by integrating a first area and a second area, the first area including whole of an image object included in the right-eye image, the second area including whole of the image object included in the left-eye image,
      controls a part of the plurality of light sources disposed in the illumination unit such that a first emission luminance at the integrated area becomes uniform, and
      controls another part of the plurality of light sources disposed in the illumination unit such that a second emission luminance at an area other than the integrated area becomes uniform.

2. The stereoscopic image display apparatus according to claim 1,
   wherein the control unit includes
      an image input processing unit that separates the input image into a right-eye image and a left-eye image;

an image object processing unit that recognizes an image object common to the right-eye image and the left-eye image which are separated by the image input processing unit;

a left and right image synthesis/area integration processing unit that divides the area of the illumination unit, based on the right-eye image, the left-eye image, and information on the object recognized by the image object processing unit, and generates composite image data obtained by synthesizing the right-eye image and the left-eye image;

a backlight control unit that sets an area affecting pixels of the transmission unit corresponding to an object included in the right-eye image and an area affecting pixels of the transmission unit corresponding to a display object included in the left-eye image corresponding to the right-eye image as one same area, and controls the plurality of light sources for each area such that emission luminance of the light sources in the area is uniform within the area, and a liquid crystal panel data correction unit that controls transmittance of pixels of the transmission unit for each pixel, based on the composite image data and an emission luminance value of each light source controlled by the backlight control unit.

3. The stereoscopic image display apparatus according to claim 1, wherein when the image object is an image object viewed closer to a user than a reference surface, the control unit integrates the areas for each image object and controls the emission luminance of the light source of the integrated area to be uniform for each area.

4. The stereoscopic image display apparatus according to claim 1, further comprising:

a central display control unit that controls the barrier unit to bar the light transmitted through the transmission unit in a case where the input image is a stereoscopic image, and not to bar the light transmitted through the transmission unit in a case where the input image is not the stereoscopic image.

5. The stereoscopic image display apparatus according to claim 3, further comprising:

a sensor that detects a user, wherein the control unit controls the barrier unit to change a position at which the light transmitted through the transmission unit is barred, based on a result detected by the sensor.

6. A display method of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be simultaneously viewed as a right-eye image and a left-eye image, the method comprising:

setting an integrated area by integrating a first area and a second area, the first area including whole of an image object included in the right-eye image, the second area including whole of the image object included in the left-eye image;

controlling a part of the plurality of light sources disposed in the illumination unit such that a first emission luminance at the integrated area becomes uniform; and controlling another part of the plurality of light sources disposed in the illumination unit such that a second emission luminance at an area other than the integrated area becomes uniform.

7. A non-transitory computer-readable recording medium storing a program of a liquid crystal display including an illumination unit in which a plurality of light sources are disposed, a transmission unit that transmits light arriving from the illumination unit for each pixel based on an input image, and changes transmittance of the light for each pixel, and a barrier unit that allows the light transmitted through the transmission unit to be simultaneously viewed as a right-eye image and a left-eye image, the program causing a computer of the liquid crystal display to:

set an integrated area by integrating a first area and a second area, the first area including whole of an image object included in the right-eye image, the second area including whole of the image object included in the left-eye image;

control a part of the plurality of light sources disposed in the illumination unit such that a first emission luminance at the integrated area becomes uniform; and control another part of the plurality of light sources disposed in the illumination unit such that a second emission luminance at an area other than the integrated area becomes uniform.

* * * * *